(12) United States Patent
Xue et al.

(10) Patent No.: US 12,503,819 B2
(45) Date of Patent: Dec. 23, 2025

(54) METHOD FOR RAPIDLY REPAIRING ROAD SURFACE

(71) Applicant: SHANXI ZHONGTU TRAFFIC TECHNOLOGY CO., LTD, Shanxi (CN)

(72) Inventors: Xiaodong Xue, Shanxi (CN); Wei Gao, Shanxi (CN); Wenbin Niu, Shanxi (CN); Peng Li, Shanxi (CN); Kai Zhang, Shanxi (CN); Xiaokang Cui, Taiyuan (CN)

(73) Assignee: SHANXI ZHONGTU TRAFFIC TECHNOLOGY CO., LTD, Shanxi (CN)

( * ) Notice: Subject to any disclaimer, the term of this patent is extended or adjusted under 35 U.S.C. 154(b) by 853 days.

(21) Appl. No.: 17/789,148

(22) PCT Filed: Dec. 11, 2020

(86) PCT No.: PCT/CN2020/135530
§ 371 (c)(1),
(2) Date: Jun. 24, 2022

(87) PCT Pub. No.: WO2021/129409
PCT Pub. Date: Jul. 1, 2021

(65) Prior Publication Data
US 2023/0045473 A1    Feb. 9, 2023

(30) Foreign Application Priority Data
Dec. 25, 2019   (CN) .................. 201911360072.6

(51) Int. Cl.
*E01C 11/00*   (2006.01)
*C09J 4/06*    (2006.01)
*C09J 5/00*    (2006.01)
*C09J 11/04*   (2006.01)
*C09J 133/12*  (2006.01)

(52) U.S. Cl.
CPC ............... *E01C 11/005* (2013.01); *C09J 4/06* (2013.01); *C09J 5/00* (2013.01); *C09J 11/04* (2013.01); *C09J 133/12* (2013.01); *C09J 2400/126* (2013.01); *C09J 2433/00* (2013.01); *C09J 2467/00* (2013.01)

(58) Field of Classification Search
CPC ............................... E01C 7/187; E01C 11/005
See application file for complete search history.

(56) References Cited

FOREIGN PATENT DOCUMENTS

| CN | 105421185 A | * | 3/2016 | ............. E01C 7/353 |
| CN | 105753367 A | * | 7/2016 | .......... C08F 283/105 |
| CN | 109401519 B | * | 8/2021 | ............... C09D 4/06 |
| CN | 111005287 B | * | 11/2021 | ............. C09J 11/04 |
| CN | 118125768 B | * | 11/2024 | ......... C04B 14/4643 |

* cited by examiner

*Primary Examiner* — Gary S Hartmann

(57) ABSTRACT

A method for rapidly repairing a road surface includes: forming a base layer reinforcing material by low-shrinkage unsaturated polyester resin, diluent, expansion agent, accelerator, and polymerization inhibitor, adding a curing agent and pouring into a base layer at a damaged part of the road surface until infiltration is stopped; laying chopped basalt fiber, forming a surface layer repair material by acrylate monomer, acrylic resin polymer, silane coupling agent, calcium carbonate powder, talc powder, quartz sand, metal hydroxide flame retardant and accelerator, polymerization inhibitor and short cut basalt fiber; adding curing agent to fill the road surface and solidifying. The repairing method can not only play a reinforcing effect on the road base, but also repair the surface layer on the damaged parts such as cracks on road surface, so as to realize the dual functions of the base layer reinforcement and the surface layer repair.

10 Claims, No Drawings

METHOD FOR RAPIDLY REPAIRING ROAD SURFACE

CROSS REFERENCE OF RELATED APPLICATION

This is a U.S. National Stage under 35 U.S.C 371 of the International Application PCT/CN2020/135530, filed Dec. 11, 2020, which claims priority under 35 U.S.C. 119(a-d) to CN 201911360072.6, filed Dec. 25, 2019.

BACKGROUND OF THE PRESENT INVENTION

Field of Invention

The present invention relates to the technical field of road maintenance, and more particularly to a method for rapidly repairing diseases of a road surface.

Description of Related Arts

During the utilization of roads, various diseases are often generated due to factors such as environment, geographical location, climate, and traffic load, as well as differences in the types of materials used, construction techniques, and designs. Common diseases mainly include potholes, ruts, cracks, subsidence, loosening, net cracks, and upheaval. If these road diseases cannot be repaired in time, they will further deteriorate under the action of water, weather and wheel rolling, until the road surface loses its use function.

Therefore, it is necessary to repair the disease of the road surface at the initial stage, restore the functionality, and prolong the service time of the road. The current road pavement repair materials mainly include cement concrete, asphalt and resin materials.

SUMMARY OF THE PRESENT INVENTION

Technical Problems

In the first two kinds of repair materials mentioned above, the cement concrete materials, being utilized at a normal temperature, are not suitable for low temperature environment, and have long maintaining time after curing; in asphalt materials, hot asphalt needs to be heated, and cold asphalt has a low bonding strength, and emulsified asphalt is not suitable for construction under low temperature conditions, so the asphalt materials mainly have problems of slow repair speed, difficult construction at low temperature and high energy consumption and etc.

Resin repair materials mainly include epoxy resins, polyurethane resins, acrylic resins, etc., and are gradually emerging. The emergence of resin repair materials has solved the problems of traditional repair materials requiring heating and long curing time. However, due to the lack of pertinence, the resin repair materials are only used directly after mixing resin with aggregate or powder, which may cause problems such as slow reaction speed and, low strength, easy to crack and other problems.

In addition, what current repair material mainly considers is surface layer repair, and without reinforcing the base of the damaged place, which cause damage of the base layer to continue developing, and cannot achieve the effect of repair.

Technical Solutions

An object of the present invention is to provide a method for rapidly repairing diseases of a road surface, which is capable of organically combining the reinforcement of a base layer of the road surface with repair of the surface layer, so as to realize the rapid repair of the road pavement without affecting the traffic release.

The method for rapidly repairing diseases of the road surface, which is capable of organically combining the reinforcement of the base layer of the road surface with repair of the surface layer thereof, comprising steps to simultaneously repair the base layer and the surface layer of the road surface as follows of:

1) adding a curing agent with a mass ratio of 2-4% to the base layer reinforcing material, mixing evenly, and pouring into a damaged part of the road surface, in such a manner that the base reinforcing material penetrates into the base layer at the damaged part of the road surface until the base reinforcing material no longer permeates;

wherein the base reinforcing material is obtained by mixing raw materials in parts by weight comprising: 50-100 parts of low-shrinkage unsaturated polyester resin, 5-10 parts of diluent, 0.5-10 parts of expansion agent, and 1.5-3 parts of accelerator, and 0.013-0.027 parts of polymerization inhibitor;

2) laying a layer of chopped basalt fiber on a surface of the damaged road surface penetrated with the base reinforcing material;

3) adding the curing agent with 2-4% of the material quality added to a surface layer repairing and reinforcing material, mixing evenly, pouring onto the damaged part of the road surface, filling in the road surface and solidifying;

wherein the surface layer repair and reinforcement material is obtained by mixing following raw materials in parts by weight comprising: 400-600 parts of acrylate monomer, 50-100 parts of acrylic resin polymer, 10-20 parts of silane coupling agent, 200-400 parts of calcium carbonate, 100-200 parts of talcum powder, 100-200 parts of quartz sand, 100-200 parts of metal hydroxide flame retardant, 2-4 parts of accelerator, 0.018-0.035 parts of polymerization inhibitor, 15-30 parts of chopped basalt fiber.

In the method for quickly repairing the road surface, the curing agent added to the base layer reinforcing material and the surface layer repairing and reinforcing material is dibenzoyl peroxide or 2, 2'-azobis (2-methylpropionitrile).

Furthermore, in the present invention, conventional accelerators and polymerization inhibitors are added to both the base reinforcing material and the surface layer repairing material, i.e., the accelerator is N'N-dimethyl-p-toluidine, or a mixture of N'N-dimethyl-p-toluidine and cobalt isocaprylate with a mass ratio of 5:1. Similarly, the polymerization inhibitor comprises but not limited to hydroquinone or phenothiazine.

In the base reinforcing material of the present invention, the diluent is methyl methacrylate and/or butyl acrylate. Preferably, the present invention adopts a mixture of methyl methacrylate and butyl acrylate with a mass ratio of 2:1 as a diluent.

In the base reinforcing material of the present invention, the expansion agent is sodium bicarbonate or ethyl acetate In the surface layer repairing material, the acrylate monomer is one member or a mixture of at least two member selected from the group consisting of: methyl methacrylate, ethyl methacrylate, n-butyl methacrylate, hydroxypropyl acrylate, diethylene glycol diacrylate and pentaerythritol triacrylate.

Furthermore, the acrylate monomer comprises at least two member of methyl methacrylate and ethyl methacrylate.

In the surface layer repairing material of the present invention, the silane coupling agent is one or member selected from the group consisting of vinyltrimethoxysilane, vinyltriethoxysilane and vinyltrichlorosilane.

Preferably, the silane coupling agent is a mixture of vinyltrimethoxysilane and vinyltrichlorosilane in any proportion, or a mixture of vinyltriethoxysilane and vinyltrichlorosilane in any proportion.

In the surface layer repairing material of the present invention, the metal hydroxide flame retardant is a mixture of aluminum hydroxide and magnesium hydroxide in a mass ratio of 2:1.

Further, in the method for rapidly repairing diseases of the road surface of the present invention, the damaged parts on the surface of the road pavement may be partially removed firstly, and then the base reinforcing material are poured.

More specifically, the base reinforcing material of the present invention is prepared according to the following method comprising steps of: adding the diluent and the polymerization inhibitor to the unsaturated polyester resin, stirring until a uniform transparent solution is formed, adding a swelling agent to disperse evenly, filtering, adding the accelerator to disperse for 15-30 min, and obtaining the basic reinforcement material.

More specifically, the surface layer repairing material of the present invention is prepared according to the following method comprising: adding acrylic resin polymer and inhibitor to acrylate monomer, stirring until a homogeneous solution is formed, adding calcium carbonate powder and talcum powder, quartz sand and metal hydroxide flame retardant, transferring to the grinder to disperse evenly, adding silane coupling agent and accelerator, stirring for 15-30 min, and finally adding chopped basalt fiber to disperse evenly to obtain the surface layer repair material.

Beneficial Effects

The pavement repair material adopted in the method for rapidly repairing diseases of the road surface of the present invention, comprising the base reinforcement material and surface layer repair material, which all belong to resinous materials. Compared with conventional repair materials, this type of material not only solves the problem of low temperature reactivity, but also has the characteristics of no heating, fast reaction speed, good weather resistance, low shrinkage rate, etc. Compared with the conventional resin materials, the materials of the present invention have excellent mechanical properties and high bond strength.

When adopting the repairing method of the present invention to repair e surface of the road pavement, pour the road pavement damage place with the base layer reinforcing material, make the base layer reinforcing material penetrate into the base layer of the road surface damage place, without waiting for the base layer reinforcing material to solidify and complete, directly sprinkle the surface with chopped basalt fibers to fill the surface repair material. The repairing method of the invention can not only play a reinforcing effect on the road base, but also can repair the surface layer on the damaged parts such as road cracks, so as to realize the dual functions of the base reinforcement and the surface layer repair.

The present invention adopts unsaturated polyester resin in the base reinforcement material, and makes the surface layer repair material react to obtain good weather resistance acrylic resin by acrylate monomer in the utilization process; wherein the acrylate monomer has a fast reaction speed, which can not only reduce the viscosity of the system and improve the reactivity during the formation of the copolymer, but also adjust the strength and toughness of the material and increase the degree of cross-linking. Importantly, due to the good weather resistance of acrylic resin, it has a longer service life than conventional resin-based repair materials and is more suitable for outdoor use. Unsaturated polyester resins have excellent mechanical properties, good reactivity, high bonding strength, are easily compatible with the above-mentioned acrylate monomers, and are not prone to delamination problems. Therefore, in the present invention, through the matching effect between the acrylic resin and the unsaturated polyester resin, the reinforcing material of the base layer and the repairing material of the surface layer are integrated with each other, and the problem of delamination and influence on each other's interaction is avoided.

After adding curing agent respectively in base-level reinforcement material and surface layer repair material, firstly base-level reinforcement material is poured into the damage place on a surface of the road pavement, because base layer reinforcement material viscosity is low, can quickly penetrate into the base of damage place. The base layer reinforcement material has high strength and excellent mechanical properties after curing, which can strengthen the base layer and prevent the further development of damage. Generally, the base layer reinforcement material needs to be fully reacted and cured before proceeding to the next step, but the present invention can use the surface layer repair material without waiting for the base layer reinforcement material to be cured, and the viscosity and density of the surface layer repair material are higher than those of the base layer repair material. The surface layer repair material will diffuse rapidly. Meanwhile, due to the good compatibility of unsaturated polyester resin and acrylic resin, the curing reaction of each other is not affect. During the curing process, a transition of mutual cross-linking and mutual penetration will gradually form at the interface. On one hand, the two are stably combined together, and there will be no defects such as delamination. On the other hand, the transition layer generated can play the role of uniformly transmitting stress and strain, and the interface will not be damaged, which meets the bearing requirements of the road, so that the damaged part of the road can be repaired systematically.

Therefore, in the repairing method of the present invention, the two organic combination of the base layer reinforcing material and the surface layer repair material have played a synergistic effect, both can play a reinforcing effect on the substrate of the road damage place, the surface layer is repaired at the damaged part as well, and the transition layer formed at the interface between the base reinforcing material and the surface layer repair material can organically combine the two materials to form an interface with mutual entanglement and mechanical properties between the two, which achieves an effect of 1+1>2.

Different from the conventional resin-based repair material that forms a macro interface between the reinforcement of the substrate and the repair of the surface layer, the repair method of the present invention replaces the apparent interface with the transition layer formed. Further experiments show that if the two components are cured separately, that is, the surface layer repair material is cured after the base reinforcing material is cured, the damage will occur at the junction of the two in the pull test. The forms are mainly in the form of base layer breaking and adhesive failure, and the bonding strength of the two has been significantly improved.

After testing, the road surface compressive strength that adopts the repairing method of the present invention is greater than 40 MPa, and the weather resistance is excellent. The repairing material used in the present invention has a good bonding effect on the road surface, and the curing time is 10-30 minutes. The construction can be completed in a short time and traffic is released, and the road can be opened to traffic quickly after the repair.

DETAILED DESCRIPTION OF THE PREFERRED EMBODIMENT

The following examples are only the preferred technical solutions of the present invention, and are not intended to limit the present invention. Various modifications and variations of the present invention are possible for those skilled in the art. Any modification, equivalent replacement, improvement, etc. made within the spirit and principle of the present invention shall be included within the protection scope of the present invention.

Example 1

Adding 5 kg methyl methacrylate and 13 g hydroquinone to 50 kg low-shrinkage unsaturated polyester resin, stirring to form homogeneous transparent solution, adding 0.5 kg sodium bicarbonate and dispersing evenly, and adding 1.5 kg N'N-dicarbonate methyl-p-toluidine, dispersing for 15 min to obtain a base layer reinforcing material.

Adding 50 kg acrylic resin polymer, and 18 g hydroquinone to 400 kg methyl methacrylate monomer, fully stirring to form homogeneous solution, adding 200 kg calcium carbonate powder, 100 kg talcum powder, 100 kg quartz sand, 67 kg aluminum hydroxide and 33.5 kg magnesium hydroxide, transferring into a grinding machine for dispersing evenly, adding 10 kg vinyltrimethoxysilane and 2 kg N'N-dimethyl-p-toluidine, stirring for 15 min, and then adding 15 kg of chopped basalt fibers to obtain surface layer repair material.

During pavement repairing construction, firstly cleaning up the pavement to be repaired, adding the dibenzoyl peroxide of 2% of the total material mass to the base reinforcing material, and evenly pouring into the crack on the surface of the road pavement, so that it is infiltrated into the crack; stopping pouring when the pouring material at the crack does not infiltrate, and sprinkling a layer of chopped basalt fiber on the surface; adding dibenzoyl peroxide with 2% of the total mass of the material to the surface layer repair material, and after stirring evenly, continuing to pour into the crack until the crack is filled up.

Example 2

Adding 5 kg methyl methacrylate and 2.5 kg butyl acrylate and 20 g phenothiazine to 80 kg low-shrinkage unsaturated polyester resin, stirring to form homogeneous transparent solution, adding 2 kg sodium bicarbonate and dispersing evenly, and adding 1.5 kg N'N-dicarbonate methyl-p-toluidine, dispersing for 20 min to obtain a base layer reinforcing material.

Adding 70 kg of acrylic resin polymer and 27 g of hydroquinone to the monomer consisting of 400 kg of ethyl methacrylate and 200 kg of n-butyl methacrylate, fully stirring to form a homogeneous solution, and adding 300 kg of calcium carbonate powder, 150 kg of talcum powder, 150 kg of quartz sand, 100 kg of aluminum hydroxide, 50 kg of magnesium hydroxide, transferring into the grinding machine and dispersing evenly, adding 10 kg of vinyltrimethoxysilane, 5 kg of vinyltrichlorosilane, 3 kg of N'N-dimethyl-p-toluidine, 0.6 kg of cobalt isooctanoate, stirring for 20 min, and then addeding 25 kg of chopped basalt fiber to obtain the surface layer repair material.

During pavement repairing construction, firstly cleaning up the pavement to be repaired, adding zaodiisobutyronitrile of 3% of the total material mass to the base reinforcing material, and evenly pouring into the crack on the surface of the road pavement, so that it is infiltrated into the crack; stopping pouring when the pouring material at the crack does not infiltrate, and sprinkling a layer of chopped basalt fiber on the surface; adding dibenzoyl peroxide with 2% of the total mass of the material to the surface layer repair material, and after stirring evenly, continuing to pour into the crack until the crack is filled up.

Example 3

Adding 5 kg of methyl methacrylate and 2.5 kg of butyl acrylate and 20 g of phenothiazine to 80 kg of low-shrinkage unsaturated polyester resin, stirring to form homogeneous transparent solution, adding 4.5 kg ethyl acetate and dispersing evenly, and adding 1.5 kg of N'N-dicarbonate methyl-p-toluidine, dispersing for 20 min to obtain a base layer reinforcing material.

Adding 70 kg of acrylic resin polymer and 27 g of hydroquinone to the monomer consisting of 450 kg of ethyl methacrylate and 100 kg of diethylene glycol diacrylate, fully stirring to form a homogeneous solution, and adding 300 kg of calcium carbonate powder, 150 kg of talcum powder, 150 kg of quartz sand, 100 kg of aluminum hydroxide, 50 kg of magnesium hydroxide, transferring into the grinding machine and dispersing evenly, adding 5 kg of vinyltrichlorosilane, 3 kg of N'N-dimethyl-p-toluidine, 0.6 kg of cobalt isooctanoate, stirring for 20 min, and then addeding 25 kg of chopped basalt fiber to obtain the surface layer repair material.

During pavement repairing construction, firstly cleaning up the pavement to be repaired, adding zaodiisobutyronitrile with 3% of the total material mass to the base reinforcing material, and evenly pouring into the crack on the surface of the road pavement, so that it is infiltrated into the crack; stopping pouring when the pouring material at the crack does not infiltrate, and sprinkling a layer of chopped basalt fiber on the surface; adding zaodiisobutyronitrile with 3% of the total mass of the material to the surface layer repair material, and after stirring evenly, continuing to pour into the crack until the crack is filled up.

Example 4

Adding 10 kg of butyl acrylate and 27 g of hydroquinone to 100 kg of low-shrinkage unsaturated polyester resin, stirring to form homogeneous transparent solution, adding 10 kg of ethyl acetate and dispersing evenly, and adding 3 kg N'N-dicarbonate methyl-p-toluidine, dispersing for 30 min to obtain a base layer reinforcing material.

Adding 100 kg of acrylic resin polymer, and 35 g of hydroquinone to a monomer composed of 350 kg of methyl methacrylate, 150 kg of hydroxypropyl acrylate and 100 kg of pentaerythritol triacrylate, fully stirring to form homogeneous solution, adding 400 kg of calcium carbonate powder, 200 kg of talcum powder, 200 kg of quartz sand, 132 kg of aluminum hydroxide and 66 kg of magnesium hydroxide, transferring into a grinding to machine for dispersing evenly, adding 15 kg of vinyltrimethoxysilane, 5 kg of inyltrichlorosilane and 4 kg of N'N-dimethyl-p-toluidine, stirring for 30 min, and then adding 30 kg of chopped basalt fibers to obtain surface layer repair material.

During pavement repairing construction, firstly cleaning up the pavement to be repaired, adding the dibenzoyl peroxide of 4% of the total material mass to the base reinforcing material, and evenly pouring into the crack on the surface of the road pavement, so that it is infiltrated into the crack; stopping pouring when the pouring material at the crack does not infiltrate, and sprinkling a layer of chopped basalt fiber on the surface; adding dibenzoyl peroxide with 4% of the total mass of the material to the surface layer repair material, and after stirring evenly, continuing to pour into the crack until the crack is filled up.

What is claimed is:

1. A method for quickly repairing a road surface, which uses a base reinforcing material combined with a surface layer repair material to quickly repair a base layer and a surface layer of the road surface simultaneously, comprising following steps of:
   1) adding a curing agent with a mass ratio of 2-4% to the base layer reinforcing material, mixing evenly, and pouring into a damaged part of the road surface, in such a manner that the base reinforcing material penetrates into the base layer at the damaged part of the road surface until the base reinforcing material no longer permeates;
   wherein the base reinforcing material is obtained by mixing raw materials in parts by weight comprising: 50-100 parts of low-shrinkage unsaturated polyester resin, 5-10 parts of diluent, 0.5-10 parts of expansion agent, and 1.5-3 parts of accelerator, and 0.013-0.027 parts of polymerization inhibitor;
   2) laying a layer of chopped basalt fiber on a surface of the damaged road surface penetrated with the base reinforcing material;
   3) adding the curing agent with 2-4% of the material quality added to a surface layer repairing and reinforcing material, mixing evenly, pouring onto the damaged part of the road surface, filling in the road surface and solidifying;
   wherein the surface layer repair and reinforcement material is obtained by mixing following raw materials in parts by weight comprising: 400-600 parts of acrylate monomer, 50-100 parts of acrylic resin polymer, 10-20 parts of silane coupling agent, 200-400 parts of calcium carbonate, 100-200 parts of talcum powder, 100-200 parts of quartz sand, 100-200 parts of metal hydroxide flame retardant, 2-4 parts of accelerator, 0.018-0.035 parts of polymerization inhibitor, 15-30 parts of chopped basalt fiber.

2. The method for quickly repairing the road surface, as recited in claim 1, wherein the curing agent added to the base layer reinforcing material and the surface layer repairing and reinforcing material is dibenzoyl peroxide or 2, 2'-Azobis (2-methylpropionitrile).

3. The method for quickly repairing the road surface, as recited in claim 1, wherein the accelerator is N'N-dimethyl-p-toluidine, or a mixture of N'N-dimethyl-p-toluidine and cobalt isocaprylate with a mass ratio of 5:1.

4. The method for quickly repairing the road surface, as recited in claim 1, wherein the polymerization inhibitor is hydroquinone or phenothiazine.

5. The method for quickly repairing the road surface, as recited in claim 1, wherein the diluent is methyl methacrylate and/or butyl acrylate.

6. The method for quickly repairing the road surface, as recited in claim 1, wherein the expansion agent is sodium bicarbonate or ethyl acetate.

7. The method for quickly repairing the road surface, as recited in claim 1, wherein the acrylate monomer is at least one member selected from the group consisting of: methyl methacrylate, ethyl methacrylate, n-butyl methacrylate, hydroxypropyl acrylate, diethylene glycol diacrylate and pentaerythritol triacrylate.

8. The method for quickly repairing the road surface, as recited in claim 7, wherein the acrylate monomer comprising at least two member of methyl methacrylate and ethyl methacrylate.

9. The method for quickly repairing the road surface, as recited in claim 1, wherein the silane coupling agent is one or member selected from the group consisting of vinyltrimethoxysilane, vinyltriethoxysilane and vinyltrichlorosilane.

10. The method for quickly repairing the road surface, as recited in claim 1, wherein the metal hydroxide flame retardant is a mixture of aluminum hydroxide and magnesium hydroxide in a mass ratio of 2:1.

* * * * *